(12) United States Patent
Weng et al.

(10) Patent No.: US 8,360,619 B2
(45) Date of Patent: Jan. 29, 2013

(54) BRIGHTNESS ENHANCEMENT FILM AND BACKLIGHT MODULE

(75) Inventors: Chao-Hung Weng, Hsin-Chu (TW); Tzeng-Ke Shiau, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 300 days.

(21) Appl. No.: 12/953,470

(22) Filed: Nov. 24, 2010

(65) Prior Publication Data
US 2011/0141718 A1 Jun. 16, 2011

(30) Foreign Application Priority Data
Dec. 14, 2009 (TW) .............................. 98142750 A (51) Int. Cl.
*F21V 5/00* (2006.01)
(52) U.S. Cl. .................. 362/311.06; 362/327; 362/330; 362/333
(58) Field of Classification Search ............ 362/311.01, 362/311.06, 326, 327, 330, 333
See application file for complete search history.

(56) References Cited

U.S. PATENT DOCUMENTS

| | | | | |
|---|---|---|---|---|
| 6,822,707 B2* | 11/2004 | Ariyoshi et al. | ............. | 349/112 |
| 6,897,911 B2* | 5/2005 | Yamaguchi | ............. | 349/57 |
| 7,309,149 B2* | 12/2007 | Lee et al. | ............. | 362/339 |
| 7,527,410 B2* | 5/2009 | Yoshizawa et al. | ............. | 362/615 |
| 2007/0002452 A1* | 1/2007 | Munro | ............. | 359/627 |
| 2007/0236940 A1* | 10/2007 | Kuroda et al. | ............. | 362/339 |
| 2007/0279727 A1 | 12/2007 | Gandhi et al. | | |
| 2009/0167983 A1* | 7/2009 | Lee et al. | ............. | 349/62 |
| 2010/0309682 A1* | 12/2010 | Shiau et al. | ............. | 362/607 |

FOREIGN PATENT DOCUMENTS
TW I295355 4/2008

* cited by examiner

*Primary Examiner* — Laura Tso
(74) *Attorney, Agent, or Firm* — Jianq Chyun IP Office (57) ABSTRACT

A brightness enhancement film including a light transmissive substrate, convex lens portions, concave lens portions, and a reflective layer is provided. The light transmissive substrate has a first surface and a second surface opposite to the first surface. The convex lens portions are disposed on the first surface. Each of the convex lens portions has a curved convex surface facing away from the light transmissive substrate. The concave lens portions are disposed on the first surface. The convex lens portions and the concave lens portions are alternately arranged. Each of the concave lens portions has a curved concave surface facing away from the light transmissive substrate. A wavy continuous curve surface is formed by the curved convex surfaces and the curved concave surfaces. The reflective layer is disposed on the second surface and has light passing openings respectively on the optical axes of the convex lens portions.

20 Claims, 10 Drawing Sheets

BRIGHTNESS ENHANCEMENT FILM AND BACKLIGHT MODULE

CROSS-REFERENCE TO RELATED APPLICATION

This application claims the priority benefit of Taiwan application serial no. 98142750, filed on Dec. 14, 2009. The entirety of the above-mentioned patent application is hereby incorporated by reference herein and made a part of this specification.

BACKGROUND OF THE INVENTION

1. Field of the Invention

The invention relates to an optical film and a backlight module using the optical film, and particularly to a brightness enhancement film (BEF) and a backlight module using the brightness enhancement film.

2. Description of Related Art

With the progress in display techniques, the flat panel display has become the mainstream among various display devices and replaces the conventional cathode ray tube (CRT). Among the various flat panel displays, the liquid crystal display (LCD) has been deeply favored by the consumers for usage and has been widely used.

Figure 1:
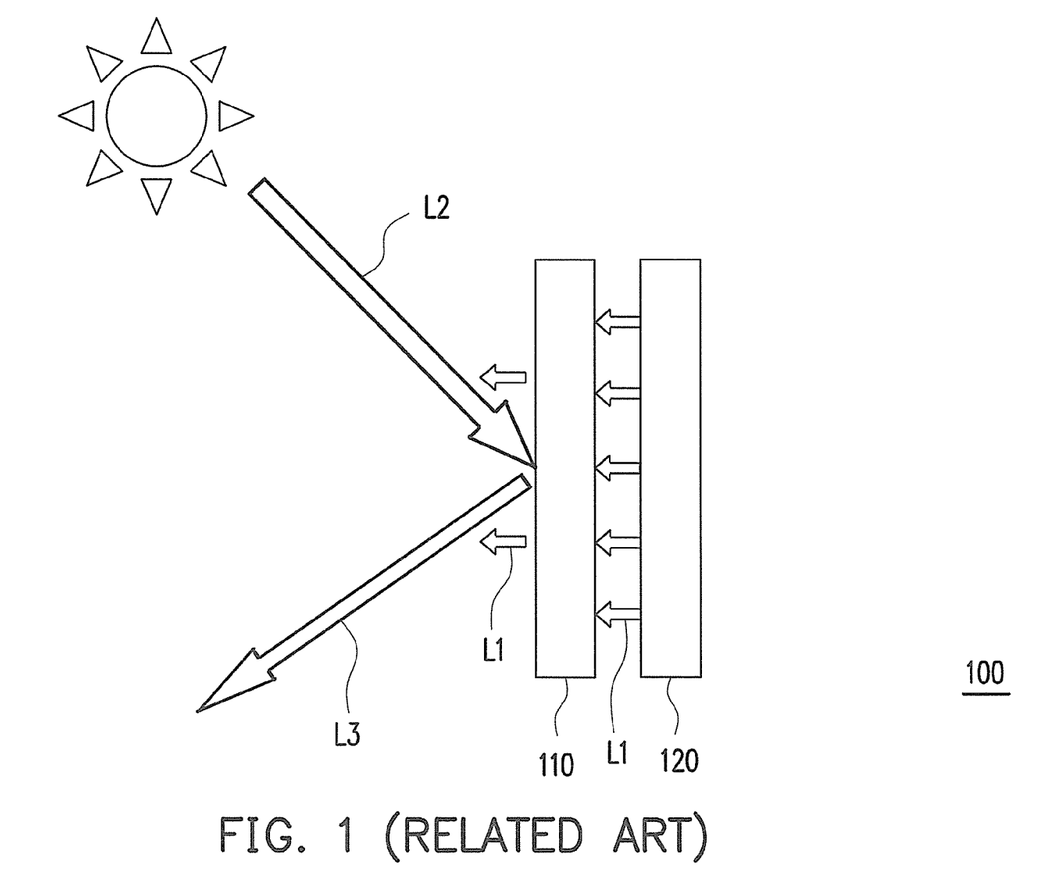
FIG. 1 is a schematic diagram of a conventional liquid crystal display.

FIG. 1 is a schematic diagram of a conventional LCD. As shown in FIG. 1, a liquid crystal display 100 includes a liquid crystal panel 110 and a backlight module 120. The liquid crystal panel 110 may not emit light but determine light transmissive rate, so that a backlight module 120 is disposed behind the liquid crystal panel 110 to be a flat light source of the liquid crystal panel 110. Generally, the backlight module 120 provides a light beam L1, and the light beam L1 propagates to the human eyes through the liquid crystal panel 110 to generate an image. However, when the environmental light L2 (such as sunlight) irradiates the liquid crystal display 100, most of the light is absorbed by the liquid crystal display 100 except for a portion of the light beam L3 reflected by the liquid crystal display 100. In other words, the utilization rate of the environmental light of the conventional liquid crystal display 100 is close to zero.

Moreover, the Taiwan Patent No. 1295355 discloses an optical diffusion module including a plurality of protrusions and a plurality of depressions. The protrusions and the depressions are alternatively arranged in wavy shape. Furthermore, the United States Patent Publication No. 2007/0279727 also discloses a light guide plate having a microstructure with a trapezoid reflection surface, wherein the microstructure is disposed on the lower surface of the light guide plate, and the light beam may be reflected by the light guide plate twice. The United States Patent Publication No. 2007/0279727 further discloses a light guide plate having a microstructure with a triangular reflection surface, wherein the microstructure is disposed on the lower surface of the light guide plate, and the light beam may be reflected by the light guide plate once.

However, by using the aforementioned light guide plate or diffusion film, the environmental light L2 may still not be successfully applied to the display light of the liquid crystal panel 110.

SUMMARY OF THE INVENTION

The invention provides a brightness enhancement film capable of effectively utilizing the environmental light and providing a relatively better optical brightness enhancement effect.

The invention also provides a brightness enhancement film capable of effectively utilizing the environmental light and having the aforementioned advantages.

The invention further provides a backlight module having the aforementioned brightness enhancement film capable of increasing the total brightness of the backlight module, further decreasing the power consumption of the backlight module and having the advantage of environmental protection and energy conservation.

Other objects and advantages of the invention may be further illustrated by the technical features broadly embodied and described as follows.

In order to achieve at least one of the above objects or other objects, an embodiment of the invention provides a brightness enhancement film including a light transmissive substrate, a plurality of convex lens portions, a plurality of concave lens portions, and a reflective layer. The light transmissive substrate has a first surface and a second surface opposite to the first surface. The convex lens portions are disposed on the first surface, wherein each of the convex lens portions has a curved convex surface facing away from the light transmissive substrate. The concave lens portions are disposed on the first surface, wherein the convex lens portions and the concave lens portions are alternately arranged. Each of the concave lens portions has a curved concave surface facing away from the light transmissive substrate, and the curved convex surfaces and the curved concave surfaces together form a wavy continuous curve surface. The reflective layer is disposed on the second surface and having a plurality of light passing openings, wherein the light passing openings are disposed on optical axes of the convex lens portions respectively.

Another embodiment of the invention further provides a brightness enhancement film including a light transmissive substrate, a plurality of convex lens portions, and a reflective layer. The light transmissive substrate has a first surface and a second surface opposite to the first surface. The convex lens portions are disposed on the first surface, wherein each of the convex lens portions has a curved convex surface facing away from the light transmissive substrate. The reflective layer is disposed on the second surface and has a plurality of light passing openings, wherein the light passing openings are disposed on optical axes of the convex lens portions respectively, and the reflective layer has a plurality of first tilted portions tilted relative to the first surface.

Yet another embodiment of the invention provides a backlight module including at least a light emitting device, the aforementioned brightness enhancement film, and an optical unit. The at least a light emitting device is capable of emitting a light beam. The brightness enhancement film is disposed in a transmission path of the light beam. The optical unit is disposed in a portion of the transmission path of the light beam between the light emitting device and the brightness enhancement film.

In summary, the embodiment or the embodiments of the invention may have at least one of the following advantages. Since the convex lens portions and the concave lens portions are disposed on the first surface, the light distribution of the light transmitted out of the first surface is more convergent and close to the direction perpendicular to the first surface after the external light is transmitted into the interior of the brightness enhancement film and is reflected by the reflective layer. Therefore, the total brightness of the backlight module using this brightness enhancement film may be effectively increased. Moreover, the first titled portions and the connecting portions connecting the first titled portions are disposed on the second surface so that the light distribution of the external light transmitted out of the first surface is convergent and close to the direction perpendicular to the first surface. Hence, the total brightness of the backlight module, using this brightness enhancement film may be effectively increased. Further, the first titled portions, the second titled portions, and the connecting portions connecting the first titled portions and the second titled portions are disposed on the second surface, and the aforementioned arrangement may achieve the aforementioned brightness enhancement effect. Therefore, the total brightness of the backlight module using this brightness enhancement film may be effectively increased.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 2A:
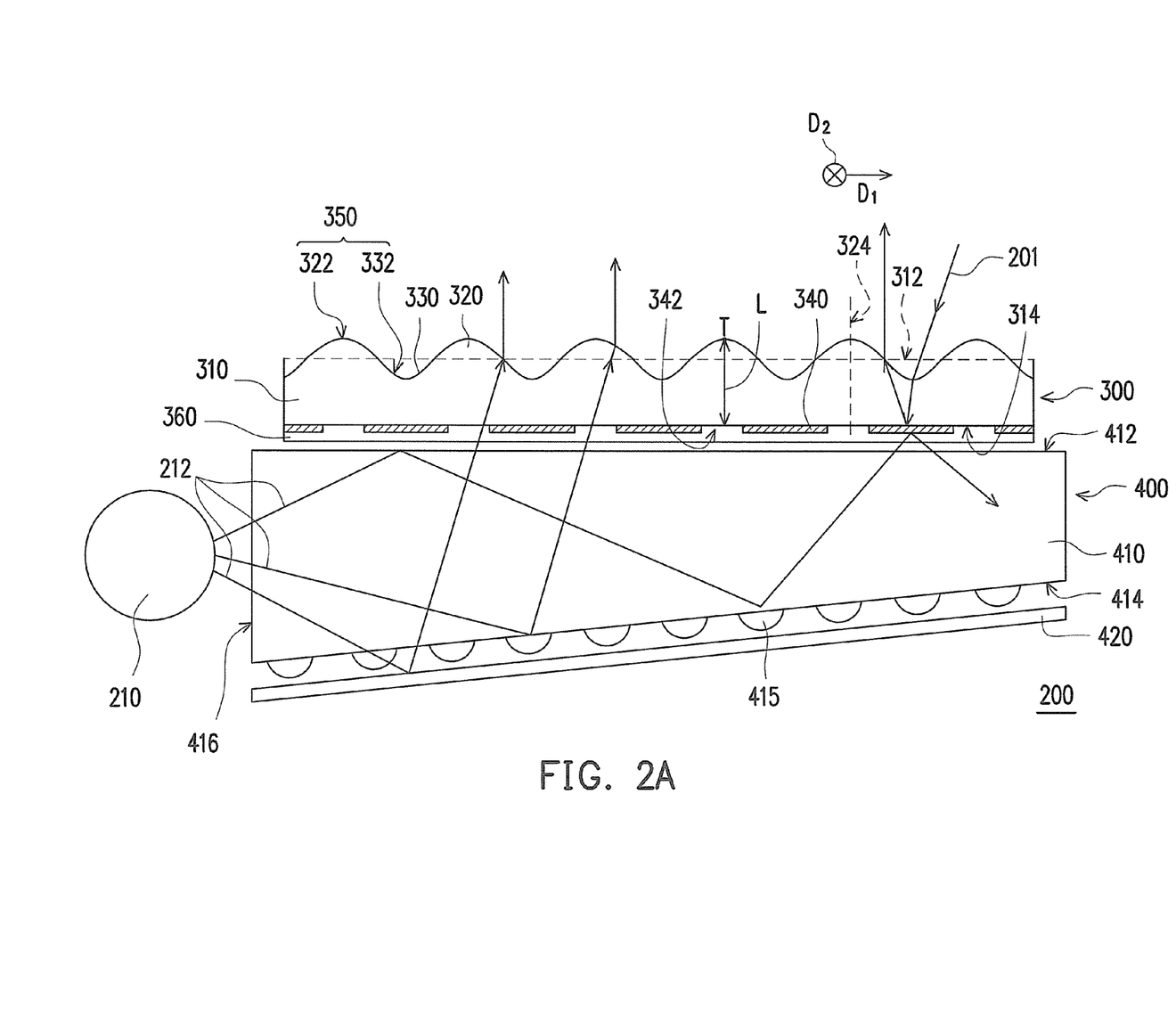
FIG. 2A and FIG. 2B illustrate schematic cross-sectional views of a backlight module along directions perpendicular to each other according to one embodiment of the invention.
Figure 2B:
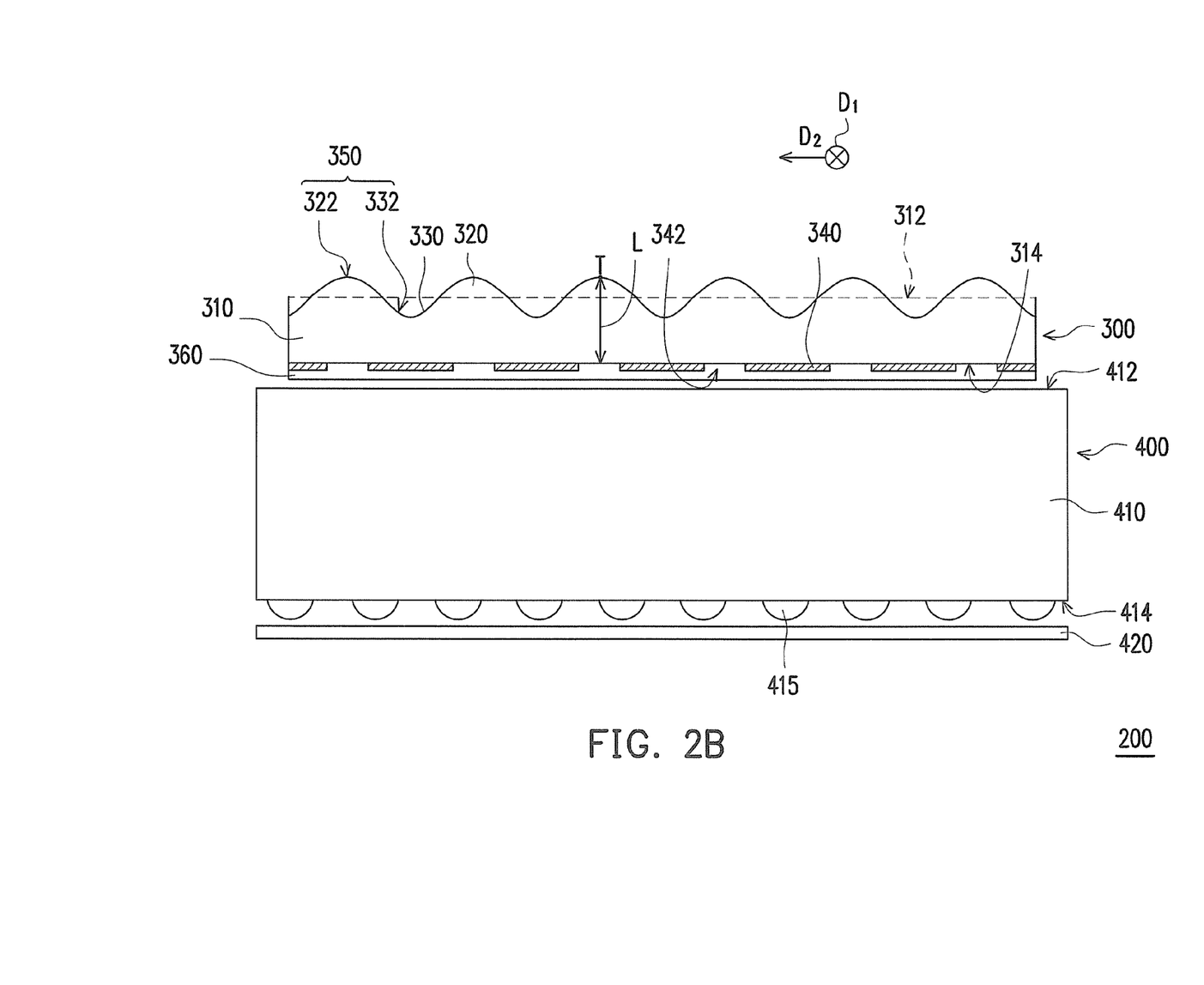
Figure 3:
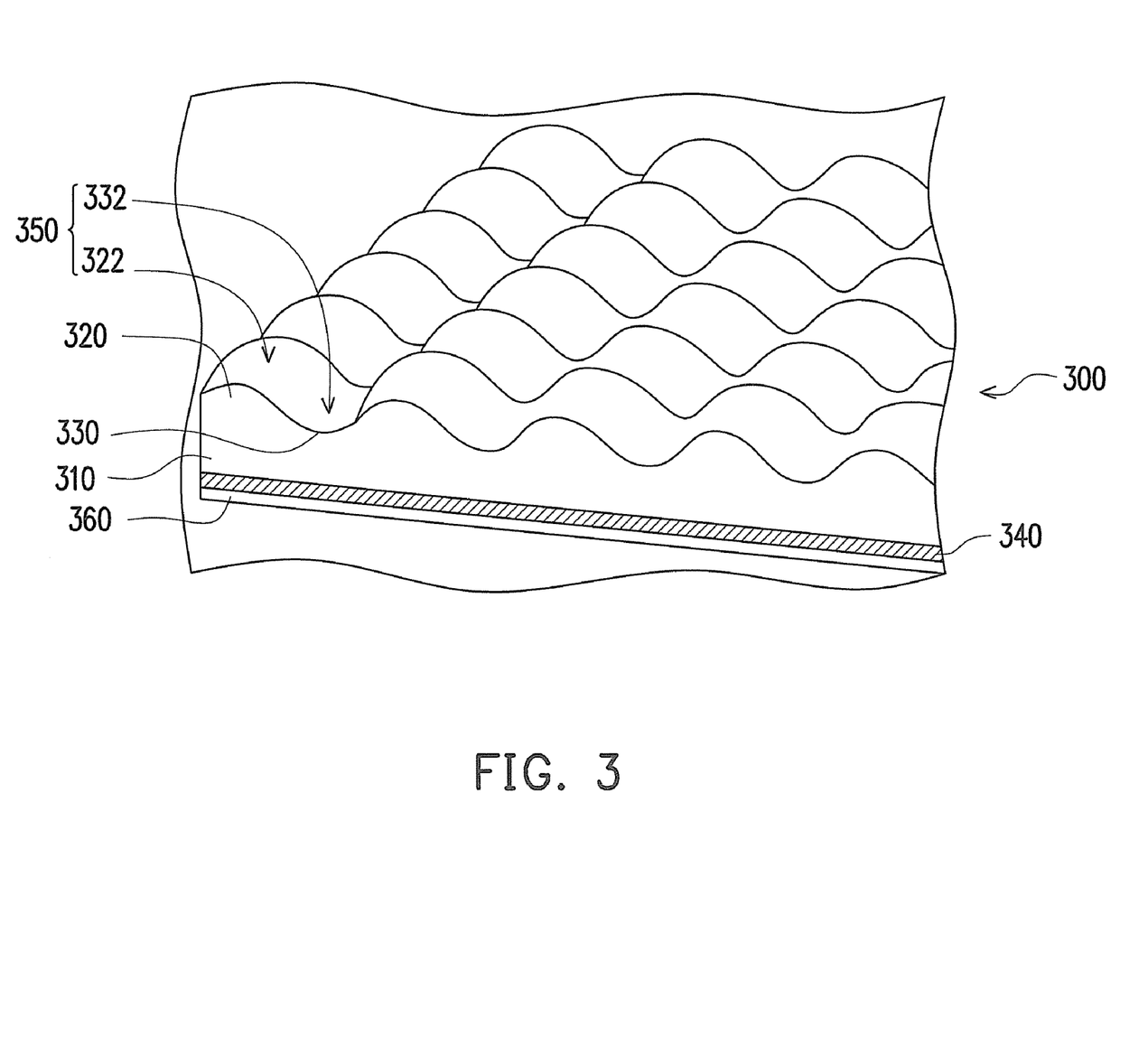
FIG. 3 illustrates a partial three-dimensional schematic view of the brightness enhancement film shown in FIG. 2A.

As shown in FIG. 2A, FIG. 2B, and FIG. 3, a backlight module 200 of this embodiment includes a light emitting device 210, a brightness enhancement film 300, and an optical unit 400. The light emitting device 210 is capable of emitting a light beam 212. In the embodiment, the light emitting device 210, for example, is a cold cathode fluorescent lamp (CCFL). However, in other embodiments, the backlight module may have a plurality of light emitting devices. For instance, the backlight module may have a plurality of light emitting devices such as a plurality of light emitting diodes (LEDs) arranged in a line.

The brightness enhancement film 300 is disposed in a transmission path of the light beam 212. The optical unit 400 is disposed in a portion of the transmission path of the light beam 212 between the light emitting device 210 and the brightness enhancement film 300. In the embodiment, the optical unit 400 includes a light guide plate 410 having a surface 412, a surface 414 opposite to the surface 412, and a light incident surface 416 connecting the surface 412 and the surface 414. The light emitting device 210 is disposed beside the light incident surface 416. Specifically, the light beam 212 from the light emitting device 210 may be transmitted into the light guide plate 410 through the light incident surface 416, the total reflection of the light beam 212 may occur between the surface 412 and the surface 414, and the light beam 212 is blocked within the light guide plate 410. Nevertheless, a microstructure 415 on the surface 414 of the light guide plate 410 may break the total reflection of the light beam 212. For instance, a portion of the light beam 212 may be reflected to the surface 412 by the microstructure 415 and then pass through the surface 412. Another portion of the light beam 212 may pass through the microstructure 415 to be transmitted to the reflective plate 420 disposed on one side of the surface 414. The reflective plate 420 may reflect the light beam 212 so that the light beam 212 sequentially passes through the surface 414 and the surface 412.

The brightness enhancement film 300 includes a light transmissive substrate 310, a plurality of convex lens portions 320, a plurality of concave lens portions 330, and a reflective layer 340. The light transmissive substrate 310 has a first surface 312 and a second surface 314 opposite to first surface 312. The convex lens portions 320 are disposed on the first surface 312, wherein each of the convex lens portions 320 has a curved convex surface 322 facing away from the light transmissive substrate 310. The concave lens portions 330 are disposed on the first surface 312, wherein the convex lens portions 320 and the concave lens portions 330 are alternately arranged. Each of the concave lens portions 330 has a curved concave surface 332 facing away from the light transmissive substrate 310, and the curved convex surfaces 322 and the curved concave surfaces 332 together form a wavy continuous curve surface 350. In the embodiment, the curved convex surface 322 and the curved concave surface 332 may be smooth curved surfaces respectively, or each of the curved convex surface 322 and the curved concave surface 332 may be composed of a plurality of tiny straight line sections or curve line sections.

The reflective layer 340 is disposed on the second surface 314 and has a plurality of light passing openings 342, wherein the light passing openings 342 are disposed on optical axes 324 of the convex lens portions 320 respectively, as shown in FIG. 2A. Moreover, the convex lens portions 320, the light transmissive substrate 310, and the concave lens portions 330 are integrally formed, as shown in FIG. 2A and FIG. 3. In other embodiments not shown in the drawings, according to the user requirement and the fabrication method, the convex lens portions 320 and the concave lens portions 330 may be integrally formed without being integrally formed with the light transmissive substrate 310. Alternatively, the convex lens portions 320 and the light transmissive substrate 310 are individually formed, and the concave lens portions 330 and the light transmissive substrate 310 are individually formed.

As shown in FIG. 2A, FIG. 2B, and FIG. 3, in the embodiment, a radius of curvature of the curved convex surface 322 in a first direction D1 parallel to the first surface 312 is $R_1$, and the radius of curvature of the curved convex surface 322 in a second direction D2 parallel to the first surface 312 is $R_2$, and by properly designing $R_1$ and $R_2$, the brightness enhancement film 300 may be applied on the backlight modules with various demands on the ranges of the light emitting angle at different directions.

Further, a distance between an apex T of the curved convex surface 322 of the convex lens portion 320 and the corresponding light passing opening 342 is L, a refractive index of the convex lens portion 320 is n, and the brightness enhancement film 300 complies with $L<nR_1/(n-1)$ and $L<nR_2/(n-1)$. Therefore, when the range of the light emitting angle of the light beam 212 transmitted out of the surface 412 is too large, most portion of the light beam 212 is adapted to be reflected to the light guide plate 410 by the reflective layer 340 and is reused. When the range of the light emitting angle of the light beam 212 transmitted out of the surface 412 is relatively small, a large proportion of the light beam 212 passes through the light passing openings 342. The light energy distribution of the light beam 212 passing through the light passing openings 342 is similar to the Gaussian distribution, and because of the convergence effect of the convex lens portions 320, the light beam 212 is transmitted out of the convex lens portions 320 along an emitting direction almost perpendicular to the first surface 312. Therefore, in the backlight module 200 of the embodiment, by utilizing the single optical film (i.e. the brightness enhancement film 300), the range of the light emitting angle is decreased, and the brightness of the liquid crystal display is increased. In other words, the brightness enhancement film complying with $L<nR_1/(n-1)$ and $L<nR_2/(n-1)$ leads to more uniform light beam 212 passing through the brightness enhancement film 300. Thus, the backlight module 200 may provide a relatively uniform surface light source. Further, in order to further improve the uniformity of the light beam 212 passing through the brightness enhancement film 300, the brightness enhancement film 300 further complies with $L<0.95nR_1/(n-1)$ and $L<0.95nR_2/(n-1)$.

Moreover, when the external light beam 201 (such as sunlight or environmental light) is transmitted to the first surface 312 of the brightness enhancement film 300, the light beam 201 is easily transmitted into the interior of the brightness enhancement film 300 and the amount of the light beam 201 directly reflected by the brightness enhancement film 300 may be greatly decreased because the concave lens portions 330 are disposed on the first surface 312. The light beam 201 transmitted into the interior of the brightness enhancement film 300 is reflected by the reflective layer 340 on the second surface 314, and the reflected light bean 201 is transmitted out of the first surface 312. Since the convex lens portions 320 and the concave lens portions 330 are disposed on the first surface 312, the light beam 201 transmitted out of the first surface 312 is converged to be close to a direction perpendicular to the first surface 312. Thus, without enhancing the light emitting strength of the light emitting device 210, the total brightness of the backlight module 200 still may be improved. In other words, by using the structure of the brightness enhancement film 300 of the embodiment, the external light beam 201 from external environment may be effectively utilized on the backlight module 200 to increase the total brightness of the backlight module 200.

In the embodiment, when a ratio of a projection area of each of the curved convex surfaces 322 orthogonally projecting on the first surface 312 to a projection area of each of the curved concave surface 332 orthogonally projecting on the first surface 312 is in a range within 1/10 to 1, the performance of applying the light beam 201 from the external environment on the backlight module 200 may be improved.

In addition, in order to improve the optical efficiency of the brightness enhancement film 300, the brightness enhancement film 300 may further include a light transmissive layer 360 covering the reflective layer 340 and filling up the light passing openings 342. In the embodiment, the light transmissive layer 360 is disposed between the reflective layer 340 and the optical unit 400. The light beam 212 is refracted once by the light transmissive layer 360 to decrease the light incident angle (for example, the light beam 212 is refracted at the interface between the atmosphere and the light transmissive layer 360) before the light beam 212 passes through the light passing openings 342 so that the circumstance that the light beam 212 is transmitted to another convex lens portion 320 beside the convex lens portion 320 corresponding to the light passing opening 342 may be improved. Thus, the optical efficiency of the brightness enhancement film 300 may be increased. Accordingly, the backlight module 200 has relatively high optical efficiency. In the embodiment, the refraction index of the light transmissive layer 360 is in a range within 1.45 to 1.6, and the refraction index of the light guide plate 410 is about 1.5, and the refraction index of the atmosphere is about 1, and the refraction index of the light transmissive plate 310 is substantially equal to the refraction index of the convex lens portion 320. Furthermore, in other embodiments, the brightness enhancement film 300 may also be arranged without having the aforementioned light transmissive layer 240.

In one embodiment, the structures of the brightness enhancement film effectively applying the environmental light beam to the backlight module 200 are described in the following.

Figure 4A:
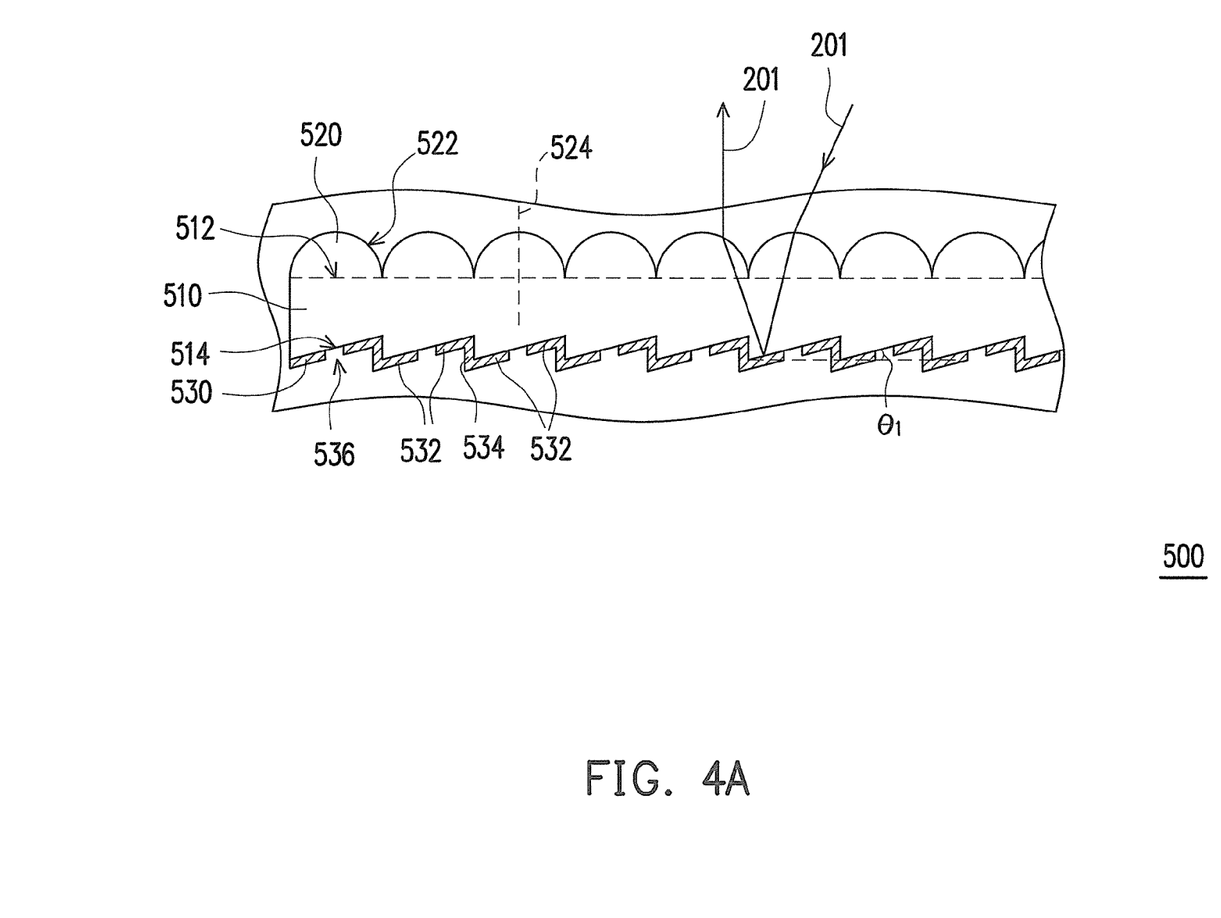
FIG. 4A illustrates a schematic partial cross-sectional view of a brightness enhancement film according to another embodiment of the invention.
Figure 4B:
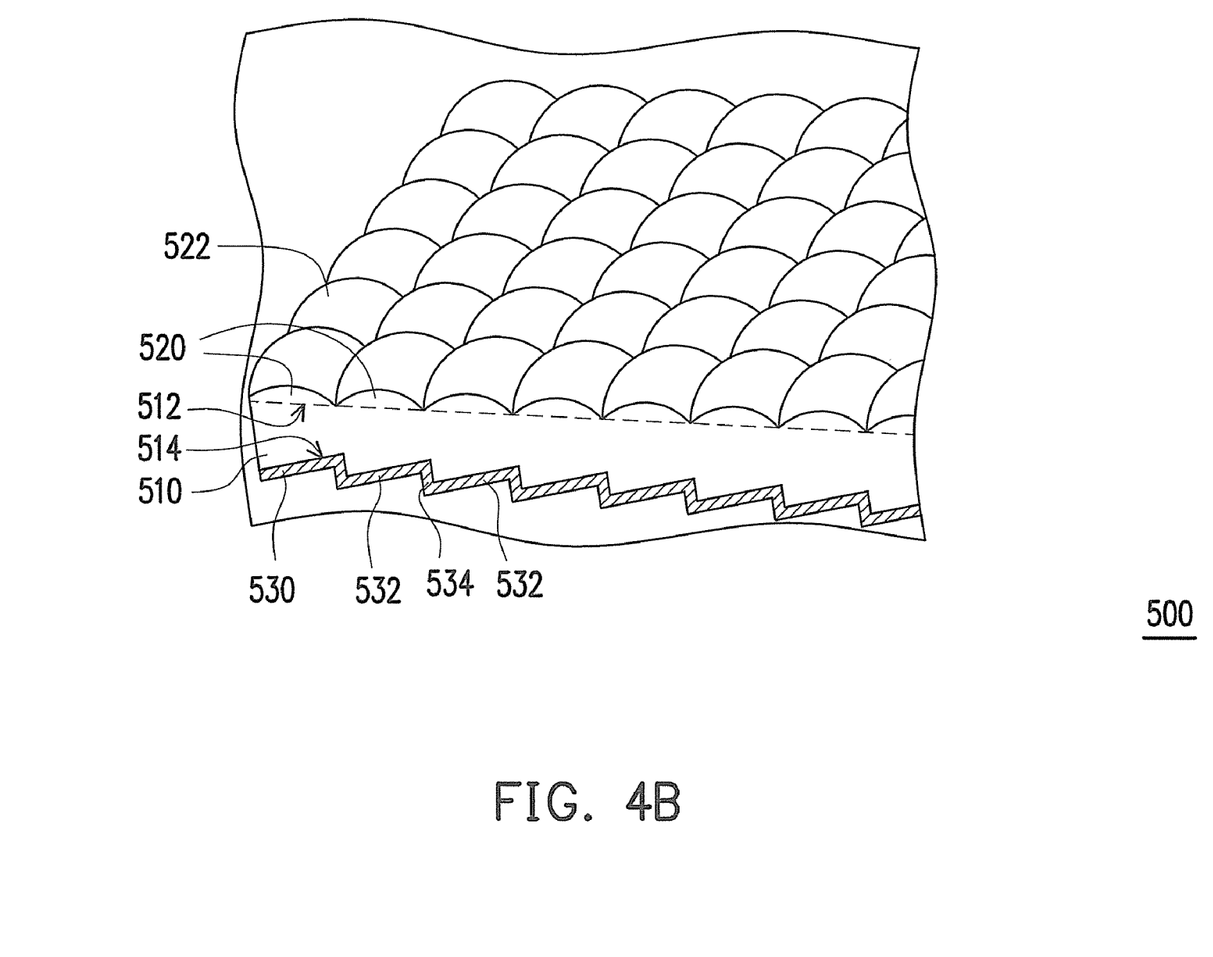
FIG. 4B illustrates, a partial three-dimensional schematic view of the brightness enhancement film shown in FIG. 4A.

As shown in FIG. 4A and FIG. 4B, a brightness enhancement film 500 of the embodiment includes a light transmissive substrate 510, a plurality of convex lens portions 520, and a reflective layer 530. The light transmissive substrate 510 has a first surface 512 and a second surface 514 opposite to first surface 512. The convex lens portions 520 are disposed on the first surface 512, wherein each of the convex lens portions 520 has a curved convex surface 522 facing away from the light transmissive substrate 510. The reflective layer 530 is disposed on the second surface 514 and has a plurality of light passing openings 536, wherein the light passing openings 536 are disposed on optical axes 524 of the convex lens portions 520 respectively, and the reflective layer 530 has a plurality of first tilted portions 532 tilted relative to the first surface 512. In the embodiment, the first tilted portions 532 are substantially parallel to each other.

Furthermore, the reflective layer 530 further includes a connecting portion 534, wherein the connecting portion 534 connects the two adjacent first tilted portions 532, as shown in FIG. 4A. In the embodiment, a titled angle $\theta_1$ of each of the first titled portions 532 relative to the first surface 512 is in a range within 5 to 25 degrees. When the titled angle $\theta_1$ is 15 degrees, the brightness enhancement film 500 may preferably apply the light beam 201 from the external environment to the backlight module 200. That is, without enhancing the light emitting strength of the light emitting device 210, the total brightness of the backlight module 200 may still be increased.

For instance, if the brightness enhancement film 500 of the embodiment replaces the brightness enhancement film 300 of FIG. 2A, after the light beam 201 is transmitted through the first surface 512 and into the interior of the brightness enhancement film 500, the light beam 201 is reflected once by the first titled portions 532 and then is transmitted out of the first surface 512, and the light beam 201 transmitted out of the first surface 512 is more convergent to be close to a direction perpendicular to the first surface 512. Thus, by using the brightness enhancement film 500 of the embodiment, the total brightness of the backlight module 200 may still be maintained even the light emitting strength of the light emitting device 210 is decreased. Hence, the power consumption is decreased. In other words, by using the structure of the brightness enhancement film 500 of the embodiment, the light beam 201 from the external environment may be effectively applied to the backlight module 200 to increase the total brightness of the backlight module 200 and to obtain the advantage of low power consumption.

Figure 5:
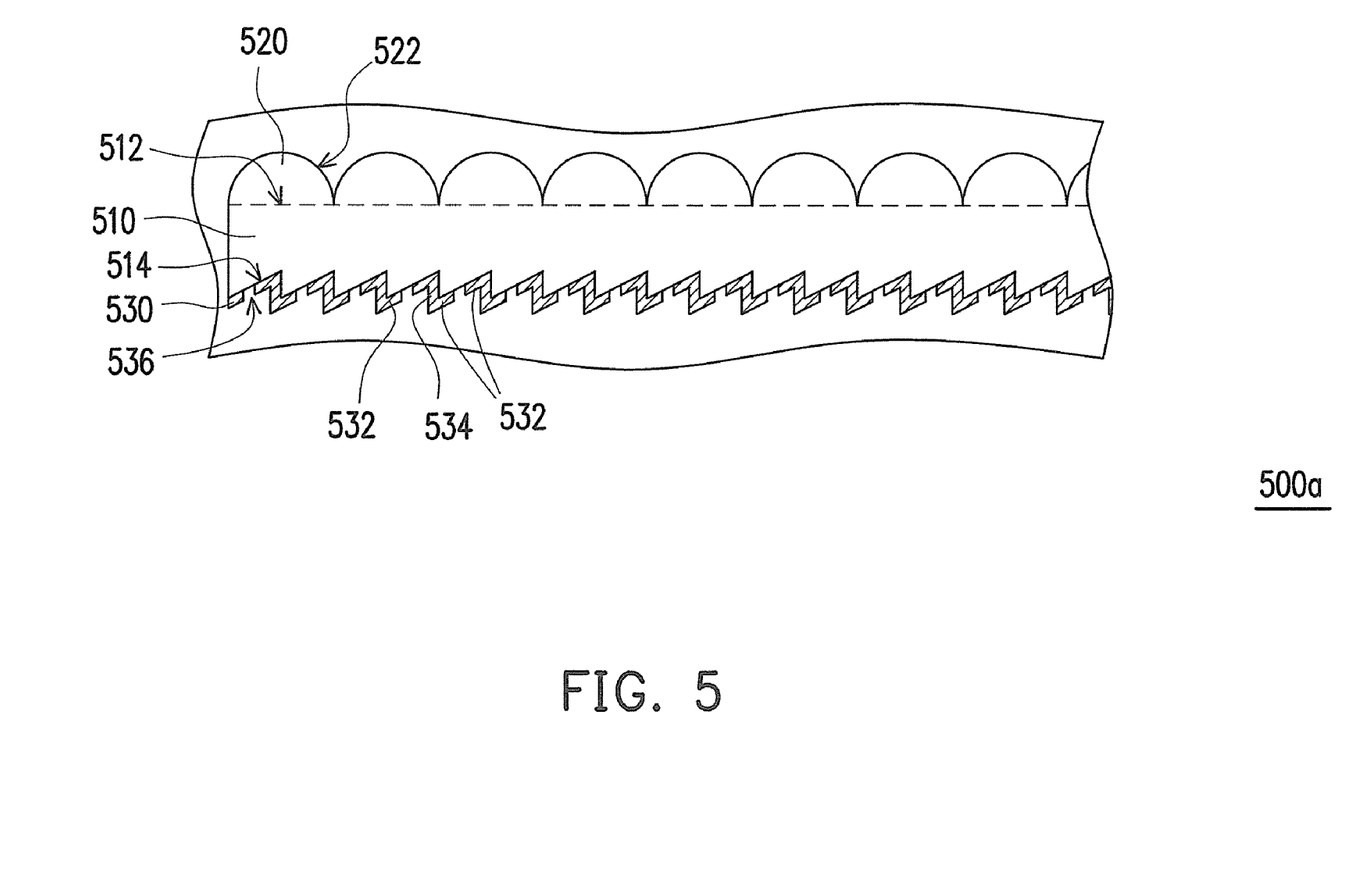
FIG. 5 illustrates a schematic partial cross-sectional view of a brightness enhancement film according to one embodiment of the invention.

In the brightness enhancement film 500, each of the first titled portions 532 corresponds to a convex lens portion 520, as shown in FIG. 4A. As shown in FIG. 5, in another brightness enhancement film 500a, more than one first titled portion 532 may correspond to one convex lens portion 520. The structure of the brightness enhancement film 500a is similar to the structure of the brightness enhancement film 500. The difference between the structure of the brightness enhancement film 500a and the structure of the brightness enhancement film 500 is that more than one first titled portion 532 may correspond to one convex lens portion 520 in the structure of the brightness enhancement film 500a. Therefore, the brightness enhancement film 500a also has the aforementioned advantages of the brightness enhancement film 500, and the aforementioned advantages are not repeatedly described herein.

Figure 6A:
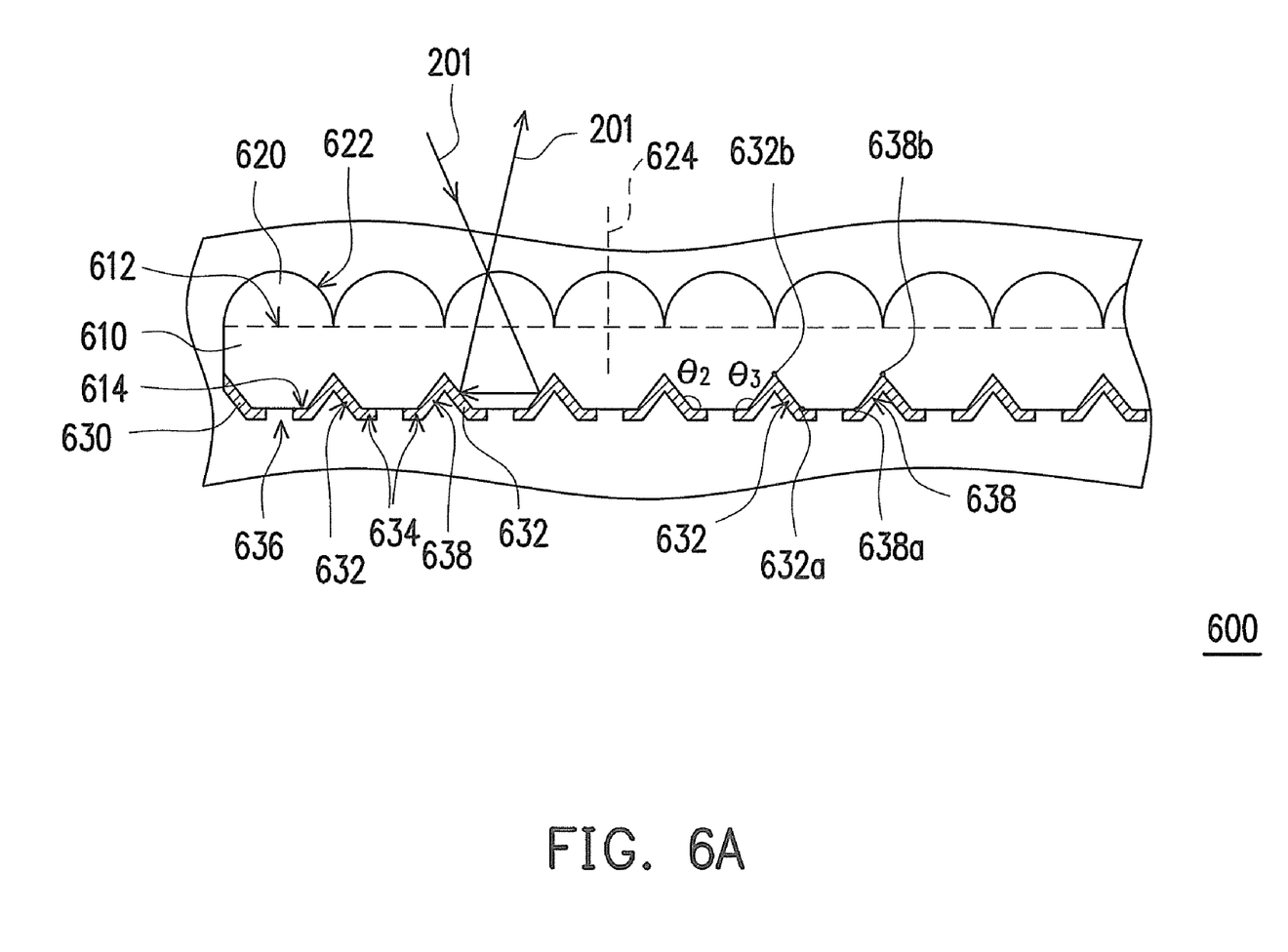
FIG. 6A illustrates a schematic partial cross-sectional view of a brightness enhancement film according to another embodiment of the invention.
Figure 6B:
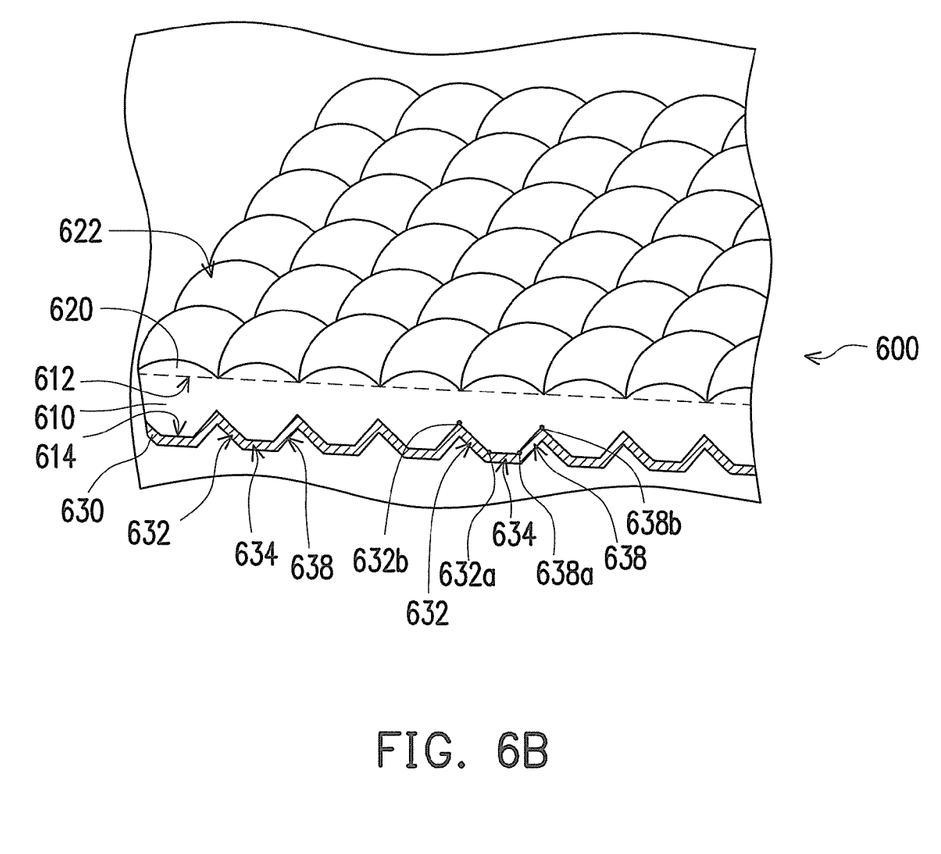
FIG. 6B illustrates a partial three-dimensional schematic view of the brightness enhancement film shown in FIG. 6A.

As shown in FIG. 6A and FIG. 6B, a brightness enhancement film 600 of the embodiment includes a light transmissive substrate 610, a plurality of convex lens portions 620, and a reflective layer 630. The light transmissive substrate 610 has a first surface 612 and a second surface 614 opposite to the first surface 612. The convex lens portions 620 are disposed on the first surface 612, wherein each of the convex lens portions 620 has a curved convex surface 622 facing away from the light transmissive substrate 610. The reflective layer 630 is disposed on the second surface 614 and has a plurality of light passing openings 636, wherein the light passing openings 636 are disposed on optical axes 624 of the convex lens portions 620 respectively, and the reflective layer 630 has a plurality of first tilted portions 632 tilted relative to the first surface 612, a plurality of second tilted portions 638 tilted relative to the first surface 612, and a plurality of connecting portions 634. The first titled portions 632 and the second titled portions 638 are alternatively arranged. In the embodiment, the first titled portions 632 are substantially parallel to each other, and the second titled portions 638 are substantially parallel to each other.

In the brightness enhancement film 600, a titled direction of the first titled portions 632 relative to the first surface 612 is substantially opposite to a titled direction of the second titled portions 638 relative to the first surface 612, as shown in FIG. 6A. More specifically, each of the first titled portions 632 has a first end 632a away from the first surface 612 and a second end 632b close to the first surface 612. Each of the second titled portions 638 has a third end 638a away from the first surface 612 and a fourth end 638b close to the first surface 612. Each of the connecting portions 634 connects the adjacent first end 632a and the third end 638a, and the adjacent second end 632b and the fourth end 638b are connected to each other, as shown in FIGS. 6A and 6B.

In the embodiment, an angle $\theta_2$ between each of the first titled portions 632 and the connecting portion 634 connecting the first titled portion 632 is in a range within 100 to 160 degrees, and an angle $\theta_3$ between each of the second titled portions 638 and the connecting portion 634 connecting the second titled portion 638 is in a range within 100 to 160 degrees. When the angle $\theta_2$ and the angle $\theta_3$ are 140 degrees and 120 degrees respectively, the brightness enhancement film 600 may preferably apply the light beam 201 from the external environment to the backlight module 200. That is, without enhancing the light emitting strength of the light emitting device 210, the total brightness of the backlight module 200 may still be increased.

For instance, if the brightness enhancement film 600 of the embodiment replaces the brightness enhancement film 300 of FIG. 2B or FIG. 2A, after the light beam 201 is transmitted through the first surface 612 and into the interior of the brightness enhancement film 600, the light beam 201 is capable of being reflected by the second titled portions 638 and then reflected by the first titled portions 632, then the reflected light beam 201 is transmitted out of the first surface 612 (that is, the light beam 201 is reflected twice in the interior of the brightness enhancement film 600), and the light beam 201 transmitted out of the first surface 612 is more convergent to be close to a direction perpendicular to the first surface 612. Thus, by using the brightness enhancement film 600 of the embodiment, the total brightness of the backlight module 200 may still be maintained, even though the light emitting strength of the light emitting device 610 is decreased. Hence, the power consumption is decreased. In other words, by using the structure of the brightness enhancement film 600 of the embodiment, the light beam 201 from the external environment may be effectively applied to the backlight module 200 to increase the total brightness of the backlight module 200 and to obtain the advantage of low power consumption.

Figure 7:
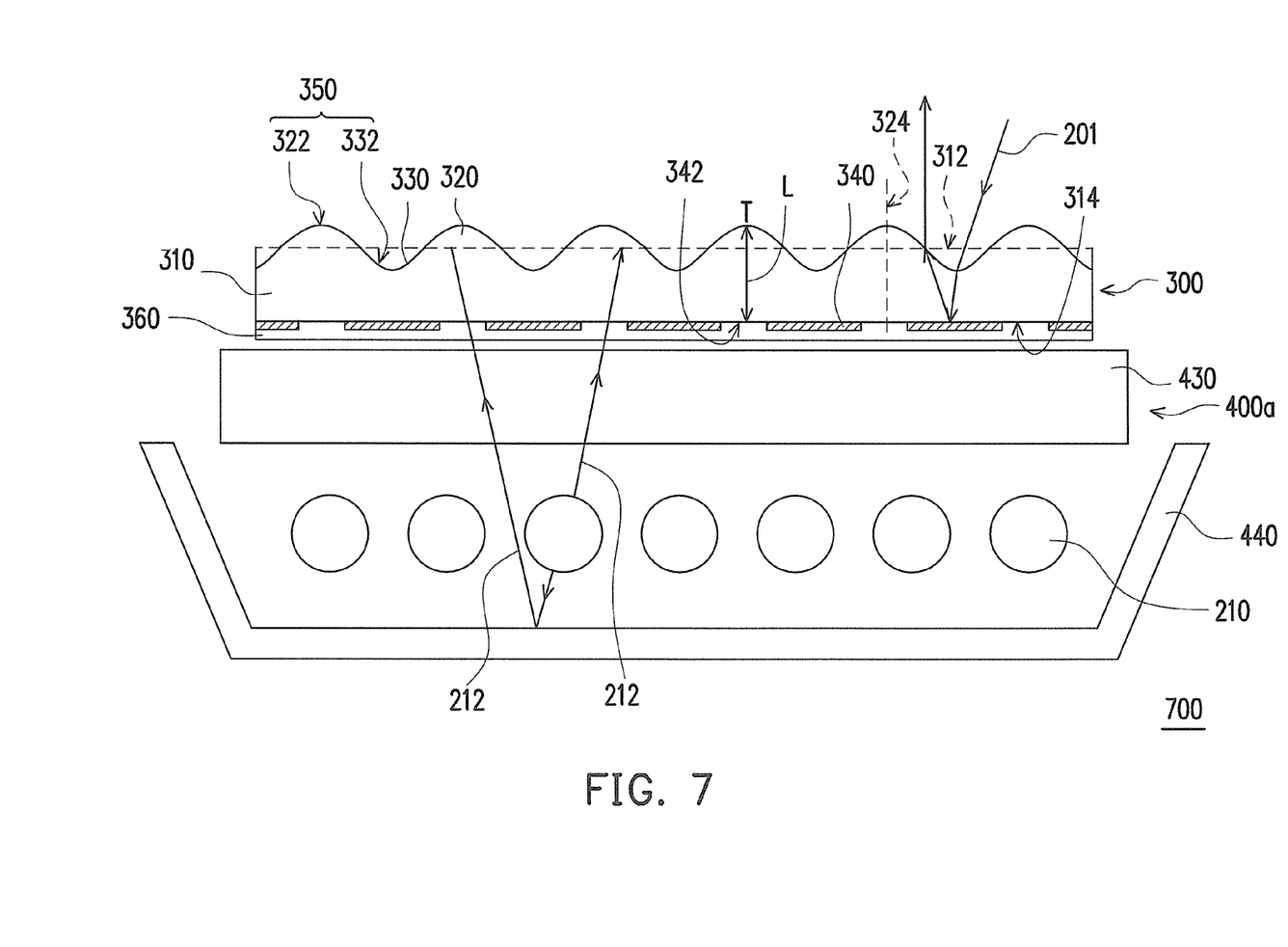
FIG. 7 illustrates a schematic cross-sectional view of a backlight module according to another embodiment of the invention.

As shown in FIG. 7, the backlight module 700 of the embodiment is similar to the backlight module 200 in FIG. 2A, and the difference between these two backlight modules is described as below. The backlight module 200 in FIG. 2A is a side type backlight module, and the backlight module 700 of the embodiment is a direct type backlight module. Specifically, the optical unit 400a includes a diffusion plate 430, and one of the features of the direct type backlight module is that the diffusion plate 430 is disposed between the brightness enhancement film 300 and the plurality of the light emitting devices 210. The light beam 212 generated by the light emitting device 210 is transmitted through the diffusion plate 430 and towards the brightness enhancement film 300 and affected by the diffusion effect of the diffusion plate 430. In the embodiment, the backlight module 700 further includes a lamp box 440, and the plurality of light emitting devices 210 are disposed in the lamp box 440. The inner wall of the lamp box 440 has the reflection ability so as to reflect the light beam 212 emitted by the light emitting devices 210 towards the diffusion plate 430.

In the backlight module 700, the brightness enhancement film 300 may adopt the designs of the aforementioned brightness enhancement films 500, 500a, 600 or the combination thereof.

In summary, the embodiment or the embodiments of the invention may have at least one of the following advantages. In the brightness enhancement film of the embodiment of the invention, because the convex lens portions and the concave lens portions are disposed on the first surface, the light distribution of the light beam from the external environment transmitted out of the first surface is convergent and close to the direction perpendicular to the first surface after the light beam from the external environment is transmitted into the interior of the brightness enhancement film and is reflected by the reflective layer. Therefore, the optical efficiency by adopting the light beam from the external environment is increased. In other words, the total brightness of the backlight module adopting this brightness enhancement film may be effectively increased.

Moreover, if the first titled portions and the connecting portions connecting the first tilted portions are disposed on the second surface, the light beam from the external environment is reflected by the first titled portions and then transmitted out of the first surface after being transmitted into the interior of the brightness enhancement film. The light distribution of the environmental light beam transmitted out of the first surface is more convergent and close to the direction perpendicular to the first surface. Thus, the optical efficiency by adopting the brightness enhancement film is increased. In other words, the total brightness of the backlight module adopting this brightness enhancement film may be effectively increased.

Moreover, if the first titled portions, the second titled portions, and the connecting portions connecting the first tilted portions and the second titled portions are disposed on the second surface, the light beam from the external environment is reflected by the second titled portions, then reflected by the first titled portions, and then transmitted out of the first surface after the light beam from the external environment is transmitted into the interior of the brightness enhancement film. The light distribution of the external light transmitted out of the first surface is more convergent and close to the direction perpendicular to the first surface. Thus, the optical efficiency by adopting the light beam from the external environment is increased. In other words, the total brightness of the backlight module adopting this brightness enhancement film may be effectively increased.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A brightness enhancement film, comprising:
  a light transmissive substrate having a first surface and a second surface opposite to the first surface;
  a plurality of convex lens portions disposed on the first surface, wherein each of the convex lens portions has a curved convex surface facing away from the light transmissive substrate;
  a plurality of concave lens portions disposed on the first surface, wherein the convex lens portions and the concave lens portions are alternately arranged, each of the concave lens portions has a curved concave surface facing away from the light transmissive substrate, and the curved convex surfaces and the curved concave surfaces together form a wavy continuous curve surface; and
  a reflective layer disposed on the second surface and having a plurality of light passing openings, wherein the light passing openings are disposed on optical axes of the convex lens portions respectively.

2. The brightness enhancement film of claim 1, wherein a ratio of a projection area of each of the curved convex surfaces orthogonally projecting on the first surface to a projection area of each of the curved concave surface orthogonally projecting on the first surface is in a range within $1/10$ to 1.

3. The brightness enhancement film of claim 1, wherein the reflective layer comprises a plurality of first tilted portions, and the first tilted portions are titled relative to the first surface.

4. The brightness enhancement film of claim 3, wherein the reflective layer further comprises a connecting portion connecting the two adjacent first titled portions.

5. The brightness enhancement film of claim 3, wherein a titled angle of each of the first titled portions relative to the first surface is in a range within 5 to 25 degrees.

6. The brightness enhancement film of claim 3, wherein the reflective layer further comprises a plurality of second tilted portions, the second tilted portions are titled relative to the first surface, and the first titled portions and the second titled portions are alternatively arranged.

7. The brightness enhancement film of claim 6, wherein a titled direction of the first titled portions relative to the first surface is substantially opposite to a titled direction of the second titled portions relative to the first surface.

8. The brightness enhancement film of claim 6, wherein the reflective layer further comprises a plurality of connecting portions, each of the first titled portions has a first end away from the first surface and a second end close to the first surface, each of the second titled portions has a third end away from the first surface and a fourth end close to the first surface, each of the connecting portions connects the adjacent first end and third end, and the adjacent second end and fourth end are connected to each other.

9. The brightness enhancement film of claim 8, wherein an angle between each of the first titled portions and the connecting portion connecting to the first titled portion is in a range within 100 to 160 degrees, and an angle between each of the second titled portions and the connecting portion connecting to the second titled portion is in a range within 100 to 160 degrees.

10. The brightness enhancement film of claim 1, wherein a radius of curvature of the curved convex surface in a first direction parallel to the first surface is $R_1$, a radius of curvature of the curved convex surface in a second direction parallel to the first surface is $R_2$, a distance between an apex of the curved convex surface and the corresponding light passing opening is L, a refractive index of the convex lens portion is n, and the brightness enhancement film complies with $L<nR_1/(n-1)$ and $L<nR_2/(n-1)$.

11. A brightness enhancement film, comprising:
a light transmissive substrate having a first surface and a second surface opposite to the first surface;
a plurality of convex lens portions disposed on the first surface, wherein each of the convex lens portions has a curved convex surface facing away from the light transmissive substrate; and
a reflective layer disposed on the second surface and having a plurality of light passing openings, wherein the light passing openings are disposed on optical axes of the convex lens portions respectively, and the reflective layer has a plurality of first tilted portions tilted relative to the first surface.

12. The brightness enhancement film of claim 11, wherein the reflective layer further comprises a connecting portion connecting the two adjacent first titled portions.

13. The brightness enhancement film of claim 11, wherein the reflective layer further comprises a plurality of second tilted portions, the second tilted portions are titled relative to the first surface, and the first titled portions and the second titled portions are alternatively arranged.

14. The brightness enhancement film of claim 13, wherein a titled direction of the first titled portions relative to the first surface is opposite to a titled direction of the second titled portions relative to the first surface.

15. The brightness enhancement film of claim 13, wherein the reflective layer further comprises a plurality of connecting portions, each of the first titled portions has a first end away from the first surface and a second end close to the first surface, each of the second titled portions has a third end away from the first surface and a fourth end close to the first surface, each of the connecting portions connects the adjacent first end and third end, and the adjacent second end and fourth end are connected to each other.

16. A backlight module, comprising:
at least a light emitting device capable of emitting a light beam;
a brightness enhancement film as claimed in claim 1, wherein the brightness enhancement film is disposed in a transmission path of the light beam; and
an optical unit disposed in a portion of the transmission path of the light beam between the light emitting device and the brightness enhancement film.

17. The backlight module of claim 16, wherein the reflective layer comprises a plurality of first tilted portions, and the first tilted portions are titled relative to the first surface.

18. The backlight module of claim 16, wherein the reflective layer further comprises a plurality of second tilted portions, the second tilted portions are titled relative to the first surface, the first titled portions and the second titled portions are alternatively arranged, and a titled direction of the first titled portions relative to the first surface is substantially opposite to a titled direction of the second titled portions relative to the first surface.

19. The backlight module of claim 18, wherein the reflective layer further comprises a plurality of connecting portions, each of the first titled portions has a first end away from the first surface and a second end close to the first surface, each of the second titled portions has a third end away from the first surface and a fourth end close to the first surface, each of the connecting portions connects the adjacent first end and third end, and the adjacent second end and fourth end are connected to each other.

20. The backlight module of claim 18, wherein the optical unit comprises a light guide plate having a third surface, a fourth surface opposite to the third surface, and a light incident surface connecting the third surface and the fourth surface, the reflective layer is disposed between the light transmissive substrate and the third surface, and the light emitting device is disposed beside the light incident surface.

* * * * *